United States Patent
Koch et al.

(10) Patent No.: US 7,525,980 B2
(45) Date of Patent: *Apr. 28, 2009

(54) NETWORK ADDRESS ASSIGNMENT IN A PASSIVE OPTICAL NETWORK

(75) Inventors: Christopher D Koch, Minneapolis, MN (US); Milton J Johnson, Lakeville, MN (US)

(73) Assignee: Calix Networks, Inc., Petaluma, CA (US)

( * ) Notice: Subject to any disclaimer, the term of this patent is extended or adjusted under 35 U.S.C. 154(b) by 674 days.

This patent is subject to a terminal disclaimer.

(21) Appl. No.: 10/910,523

(22) Filed: Aug. 3, 2004

(65) Prior Publication Data

US 2005/0018681 A1  Jan. 27, 2005

Related U.S. Application Data

(63) Continuation of application No. 10/144,008, filed on May 9, 2002, now Pat. No. 7,020,157.

(51) Int. Cl.
*H04L 12/24* (2006.01)

(52) U.S. Cl. ........................ 370/420; 370/463

(58) Field of Classification Search ......... 370/400, 370/401, 419–421, 463, 475, 754; 709/220, 709/226, 245

See application file for complete search history.

(56) References Cited

U.S. PATENT DOCUMENTS

| | | | |
|---|---|---|---|
| 6,091,737 A | 7/2000 | Hong et al. | |
| 6,101,182 A | 8/2000 | Sistanizadeh et al. | |
| 6,178,455 B1 | 1/2001 | Schutte et al. | |
| 6,212,563 B1 | 4/2001 | Beser | |
| 6,229,788 B1 | 5/2001 | Graves et al. | |
| 6,282,201 B1 | 8/2001 | Alexander, Jr. et al. | |

(Continued)

FOREIGN PATENT DOCUMENTS

EP  0 946 027 A  9/1999

(Continued)

OTHER PUBLICATIONS

European Search Report for corresponding Application No. 03 724 487.8-2413, dated Jul. 7, 2006, 8 pages.

(Continued)

*Primary Examiner*—Wing F Chan
*Assistant Examiner*—Duc T Duong
(74) *Attorney, Agent, or Firm*—Schumaker & Sieffert, P.A.

(57) ABSTRACT

Assignment of network addresses, e.g., IP addresses, to network nodes in a passive optical network (PON) may involve assignment of IP addresses within a common subnet scope to network nodes coupled to different optical fiber links and different interface modules in the PON. In this manner, excessive waste of IP addresses can be avoided. Instead of assigning an entire subnet scope of addresses to the nodes coupled to a single optical fiber link, a common subnet can be allocated across a PON having multiple, independent interfaces, increasing the number of subnet IP addresses that are actually used. Accordingly, the IP address space within a subnet scope can be distributed more efficiently. In addition to conserving IP addresses, the number of subnets allocated by ISPs can be reduced, along with the significant expense incurred by ISPs in reserving and maintaining multiple class C subnets.

17 Claims, 6 Drawing Sheets

U.S. PATENT DOCUMENTS

| | | | |
|---|---|---|---|
| 6,289,377 B1 | | 9/2001 | Lalwaney et al. |
| 6,301,223 B1 | | 10/2001 | Hrastar et al. |
| 6,324,577 B1 | | 11/2001 | Hirai |
| 6,334,219 B1 | | 12/2001 | Hill et al. |
| 6,424,654 B1 | | 7/2002 | Daizo |
| 6,510,162 B1 | * | 1/2003 | Fijolek et al. ............... 370/432 |
| 6,574,664 B1 | | 6/2003 | Liu et al. |
| 6,578,074 B1 | | 6/2003 | Bahlmann |
| 6,640,251 B1 | * | 10/2003 | Wiget et al. ................. 709/238 |
| 6,697,360 B1 | * | 2/2004 | Gai et al. .................... 370/389 |
| 7,020,157 B2 | | 3/2006 | Koch et al. |
| 7,058,007 B1 | * | 6/2006 | Daruwalla et al. .......... 370/216 |
| 7,072,337 B1 | | 7/2006 | Arutyunov et al. |
| 7,181,142 B1 | | 2/2007 | Xu et al. |
| 7,373,397 B2 | * | 5/2008 | Johnson et al. ............. 709/220 |
| 2001/0030977 A1 | | 10/2001 | May |
| 2002/0013518 A1 | | 1/2002 | West et al. |
| 2002/0016858 A1 | | 2/2002 | Sawada et al. |
| 2002/0023273 A1 | | 2/2002 | Song |
| 2002/0146026 A1 | | 10/2002 | Unitt et al. |
| 2003/0069954 A1 | | 4/2003 | Ma et al. |
| 2003/0088700 A1 | | 5/2003 | Aiken |

FOREIGN PATENT DOCUMENTS

| | | |
|---|---|---|
| EP | 1 202 494 A2 | 5/2002 |
| WO | WO97/48210 | 12/1997 |
| WO | WO/00/44132 | 7/2000 |

OTHER PUBLICATIONS

Supplemental Partial European Search Report for patent application No. 03 724 487.8-2416, filed Nov. 2, 2004, 5 pages (Jun. 17, 2005).

Tom Sheldon, "FTTH (Fiber to the Home)" Linktionary, Online, Mar. 22, 2002. http://www.linktionary.com/f/fiber_home.html.

"Understanding IP Addressing: Everything You Ever Wanted to Know," Chuck Semeria, NSD Marketing, 3Com Corporation, Apr. 26, 1996.

"Dynamic Host Configuration Protocol," R. Droms, Bucknell University, RFC 2131, Mar. 1997.

"A Practical Approach to Assigning Subnet Masks," John P. Abraham, Proceedings of the ETCE/OMAE 2000 Joint Conference, New Orleans, LA, 2000.

"AT&T Broadband ISP Choice Trail A Success," AT&T News Release, Jun. 7, 2001.

"How Do I Set Up a DHCP Relay Agent and Scope for a LAN Segment That Does Not have a DHCP Server," www.ezine.com/QandA/DHCPRelay.html, Apr. 15, 2002.

"Introduction to Internet Networking," http://supportnet.merit.edu/.

Droms, "Dynamics Host Configuration Protocol", Network Working Group, Mar. 1997, p. 12.

Office Action for U.S. Appl. No. 10/449,854, mailed Jun. 8, 2007, 22 pages.

Amendment to Office Action for U.S. Appl. No. 10/449,854, filed Oct. 9, 2007, 14 pages.

Office Action for U.S. Appl. No. 10/449,854, mailed Jan. 7, 2008, 10 pages.

Amendment to Office Action for U.S. Appl. No. 10/449,854, filed Apr. 7, 2008, 15 pages.

U.S. Appl. No. 10/449,854, entitled "Maintaining Routing Information In A Passive Optical Network", filed May 30, 2003, Koch et al.

Supplemental European Search Report for patent application No. 03 724 487.8-2416, filed Nov. 2, 2004, 6 pages (Sep. 14, 2005).

Kim Kinnear et al., "Subnet Selection sub-option for Relay Agent Information Option", Internet Engineering Task Force, IETF, Mar. 2001, (7 pages).

Office Action for U.S. Appl. No. 10/449,854, mailed Dec. 18, 2008, 13 pages.

* cited by examiner

NETWORK ADDRESS ASSIGNMENT IN A PASSIVE OPTICAL NETWORK

This is a continuation of application Ser. No. 10/144,008, filed May 9, 2002, now U.S. Pat. No. 7,020,157 the entire content of which is incorporated herein by reference.

TECHNICAL FIELD

The invention relates to computer networking and, more particularly, assignment of network addresses such as IP addresses within a passive optical network (PON).

BACKGROUND

A passive optical network (PON) can deliver voice, video and other data among multiple network nodes using a common optical fiber link. Passive optical splitters and combiners enable a number of network nodes to share the optical fiber link. Each network node terminates the optical fiber link for a residential or business subscriber, and is sometimes referred to as a subscriber premises node. A PON typically includes a PON interface having multiple, independent PON interface modules that serve multiple optical fiber links. In the case of data services, the PON interface receives data packets from an Internet service provider for transmission to network nodes. A PON interface module provides an Ethernet interface for transmission and reception of over a particular optical fiber link that serves a group of network nodes.

A group of network nodes ordinarily forms a subnet for purposes of IP addressing. In particular, a PON interface module typically carries a class C network address. Consequently, the group of network nodes served by a PON interface module consumes an entire subnet scope of IP addresses. Unfortunately, the number of network nodes served by a given PON interface module may be much less than the number of available addresses within the subnet scope, e.g., 255 addresses. Dedication of an entire subnet scope to a single PON interface module therefore results in wasted IP addresses, i.e., addresses that are not used within the group of network nodes. Moreover, an Internet service provider (ISP) must allocate an entire subnet to each PON interface module, which can be expensive.

SUMMARY

In general, the invention is directed to techniques for assignment of IP addresses to network nodes in a PON. The invention enables assignment of IP addresses within a common subnet scope to network nodes coupled to different optical fiber links and different interface modules in the PON. In this manner, the invention permits groups of network nodes coupled to different optical fiber links within the PON to carry IP addresses within a common subnet. In addition, the invention permits ISPs to consume less class C IP address spaces when attaching to multiple, independent PON interface modules.

In one embodiment, the invention provides a PON comprising a first group of network nodes and a second group of network nodes. A first interface module transmits information to the first group of nodes via a first optical fiber link. A second interface module transmits information to the second group of nodes via a second optical fiber link. A first dynamic host configuration protocol (DHCP) relay agent, associated with the first interface module, generates DHCP proxy requests for the first group of network nodes. In addition, a second DHCP relay agent, associated with the second interface module, generates DHCP proxy requests for the second group of network nodes. A DHCP server assigns IP addresses to the network nodes in the first and second groups in response to the DHCP proxy requests generated by the first and second DHCP relay agents. At least some of the IP addresses assigned to the network nodes in the first group and at least some of the IP addresses assigned to the network nodes in the second group are within a common subnet scope.

In another embodiment, the invention provides a PON comprising a first group of network nodes coupled to a first optical fiber link, and a second group of network nodes coupled to a second optical fiber link, wherein some of the network nodes in the first group and some of the network nodes in the second group have IP addresses within a common subnet scope.

In a further embodiment, the invention provides an interface for a PON. The interface comprises a first interface module that transmits information to a first group of nodes via a first optical fiber link, and a second interface module that transmits information to a second group of nodes via a second optical fiber link. A first DHCP relay agent, associated with the first interface module, generates DHCP proxy requests for the first group of network nodes, and a second DHCP relay agent, associated with the second interface module, that generates DHCP proxy requests for the second group of network nodes.

In an added embodiment, the invention provides an interface for a PON. The interface comprises an interface module that transmits information to a first group of network nodes coupled to a first optical fiber link, and a DHCP relay agent, associated with the interface module, that generates DHCP proxy requests for assignment of IP addresses to the first group of network nodes. An address resolution protocol (ARP) agent generates proxy ARP requests for the first group of network nodes to determine IP addresses for a second group of network nodes coupled to a second optical fiber link and having IP addresses in a common subnet scope with the IP addresses of the first group of network nodes.

In another embodiment, the invention provides a method comprising assigning first IP addresses to a first group of network nodes coupled to a first optical fiber link, and assigning second IP addresses to a second group of network nodes coupled to a second optical fiber link, wherein at least some of the first IP addresses assigned to the network nodes in the first group and at least some of the second IP addresses assigned to the network nodes in the second group are within a common subnet scope.

The invention may provide one or more advantages. In particular, the invention can help avoid excessive waste of IP addresses. The invention may be useful for both IPv4 and IPv6 address, but is especially advantageous for conserving the rapidly depleting supply of available 32-bit IPv4 addresses. Instead of assigning an entire subnet scope of addresses to the nodes coupled to a single optical fiber link, the invention permits nodes coupled to different optical fiber links to be addressed as a common subnet. In this manner, the invention enables IP addresses within a common subnet to be allocated across a PON having multiple, independent interfaces, increasing the number of subnet IP addresses that are actually used. Accordingly, the IP address space within a subnet scope can be distributed more efficiently. In addition to conserving IP addresses, the invention can help in reducing the number of subnets allocated by ISPs, and the significant expense incurred by ISPs in reserving and maintaining multiple class C subnets.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
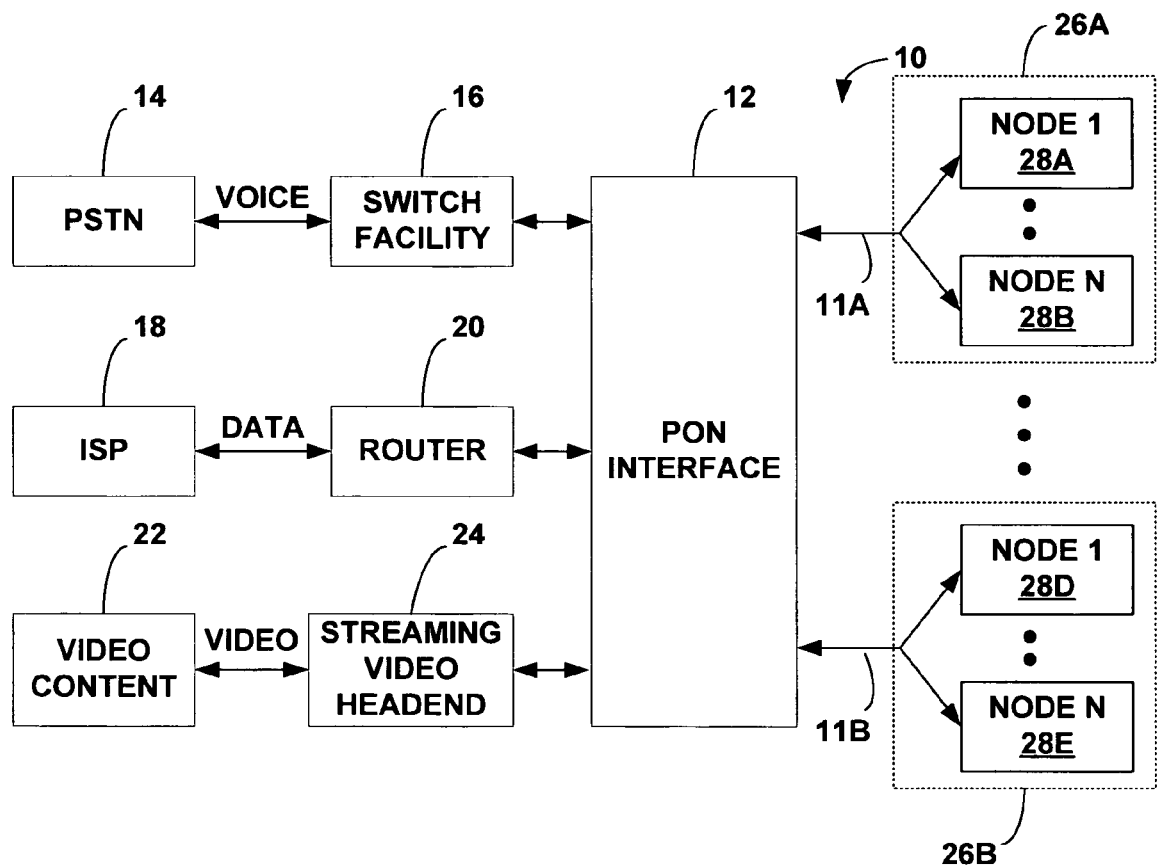
FIG. 1 is a block diagram illustrating an exemplary PON.

FIG. 1 is a block diagram illustrating a passive optical network (PON) 10. As will be described, various components of PON 10 may incorporate features that enable IP addresses within a common subnet scope to be assigned to network nodes coupled to different optical fiber links and different interface modules. As shown in FIG. 1, PON 10 can be arranged to deliver voice, data and video content (generally "information") to a number of network nodes via optical fiber links 11. Exemplary components for implementing a PON are commercially available from Optical Solutions, Inc., of Minneapolis, Minn., and designated by the tradename Fiberpath 400™, including the Fiberdrive™ headend bay interface and the Fiberpoint™ subscriber premise nodes.

A PON interface 12 may receive voice information, for example, from the public switched telephone network (PSTN) 14 via a switch facility 16. In addition, PON interface 12 may be coupled to one or more Internet service providers (ISP's) on Internet 18 via a router 20. As further shown in FIG. 1, PON interface 12 may receive video content 22 from video content suppliers via a streaming video headend 24. In each case, PON interface 12 receives the information, and distributes it along optical fiber links 11A, 11B (collectively 11) to groups 26A, 26B (collectively 26) of network nodes 28A, 28B, 28C, 28D (collectively 28). Each group 26 is coupled to a particular optical fiber link 11.

Network nodes 28 include hardware for receiving information from PON 10 via optical fiber links 11, and delivering the information to one or more devices within a local area network (LAN) associated with the node. For example, each network node 28 may serve as a PON access point for one or more computers, network appliances, televisions, wireless devices, or the like. PON interface 12 may be located near or far from a group 26 of network nodes 28. In some existing networks, however, PON interface 12 may reside in a central office situated within approximately ten miles from each network node 28.

A network node 28 may be located at any of a variety of locations, including residential or business sites. In addition, a single network node 28 may operate on a shared basis to deliver information to two or more closely located residences or businesses via copper or additional optical fiber connections, either directly or via a network hub, router or switch. A group 26 of network nodes 28 may refer to nodes served by PON interface 12 via a common optical fiber link 11. Each group 26 in FIG. 1 contains two network nodes 28 for purposes of illustration. However, a group 26 may include a single network node, or numerous network nodes 28.

Network nodes 28 also may include hardware for transmitting information over PON 10. For example, a network node 28 may transmit voice information over PSTN 14 via PON interface 12 and switch facility 16 in the course of a telephone conversation. In addition, a network node 28 may transmit data to a variety of network nodes on the Internet via ISP 18, router 20 and PON interface 12. Multiple network nodes 28 typically transmit over a common optical fiber link 11 using time division multiplexing techniques.

Each network node 28 has an IP address that is used to route packets to and from the node. The IP address may be an IPv4 address or an IPv6 address, although conservation of IP addresses is generally a much greater concern for the 32-bit IPv4 addresses. As will be explained, network nodes 28 in different groups 26 served by different optical fiber links 11 may be assigned IP addresses within a common subnet scope, thereby conserving IP addresses and promoting increased IP address usage.

Figure 2:
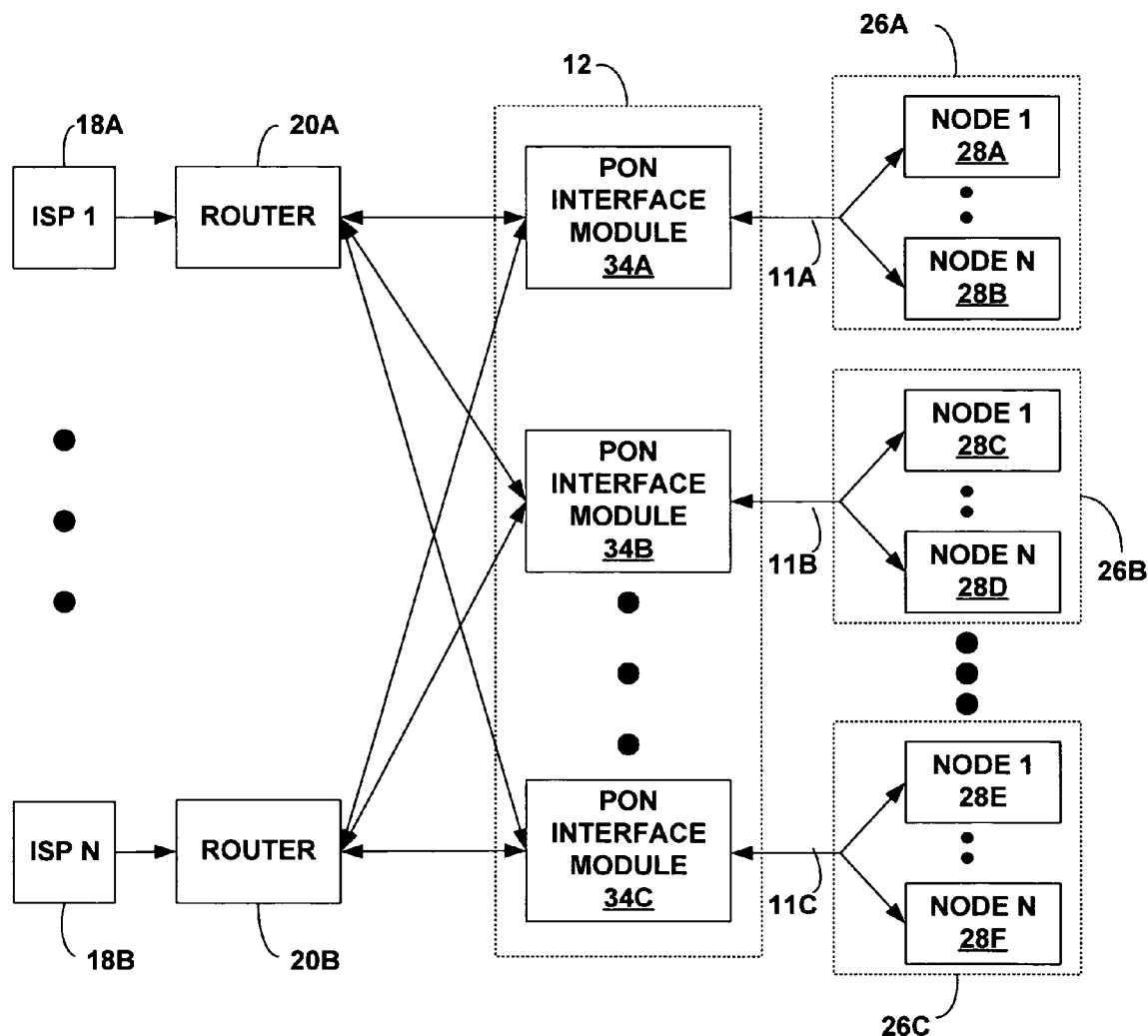
FIG. 2 is a block diagram illustrating a PON with groups of network nodes coupled to multiple optical fiber links.

FIG. 2 is a block diagram illustrating a PON with groups 26 of network nodes 28 coupled to multiple PON interface modules 34A, 34B, 34C (collectively 34) within PON interface 12. PON interface 12 may include multiple PON interface modules 34, e.g., arranged in a common chassis. Each PON interface module 34 may form an independent Ethernet interface that serves a group 26 of nodes 28 coupled to a common optical fiber link 11. Hence, PON interface module 34 and nodes 28 terminate opposite ends of optical fiber link 11.

In some embodiments, an optical fiber link 11 may include a pair of optical fibers, forming an outgoing link and an incoming link. As shown in FIG. 2, PON interface modules 34 receive information from one of more ISPs 18A, 18B (collectively 18) via network routers 20A, 20B (collectively 20), and transmit the information to nodes 28 via optical fiber link 11. Similarly, PON interface modules 34 receive information from nodes 28, and transmit the information to ISPs 18 via routers 20. In the example of FIG. 2, the transmitted information may take the form of data packets.

Figure 3:
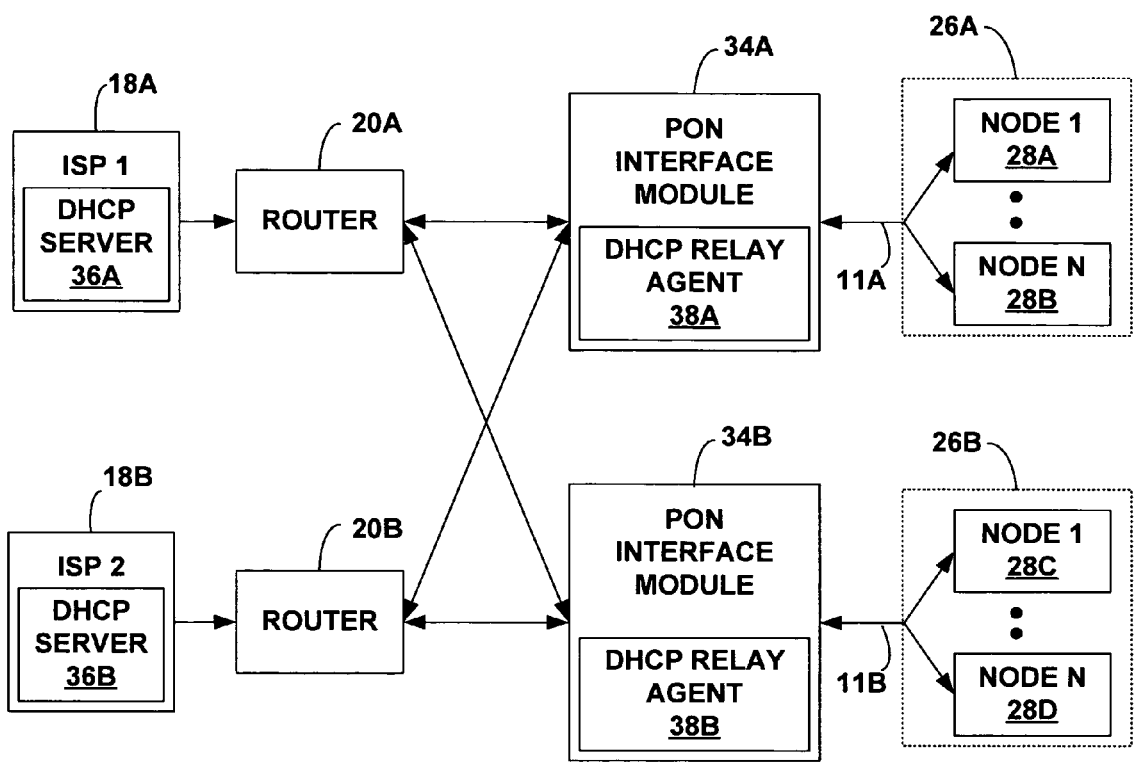
FIG. 3 is a block diagram illustrating a PON with a DHCP relay agent feature that permits allocation of IP addresses within the same subnet scope to different groups of network nodes.

FIG. 3 is a block diagram illustrating a PON with a DHCP relay agent feature that permits allocation of IP addresses within the same subnet scope to different groups of network nodes. As shown in FIG. 3, each PON interface module 34 incorporates a DHCP relay agent 38A, 38B (collectively 38) that generates DHCP proxy requests for the group 26 of network nodes 28 served by the respective PON interface module 34. In particular, when a node 28 requires an IP address, e.g., upon boot or lease expiration, the node transmits a DHCP request to PON interface module 34. In response, DHCP relay agent 38 within PON interface module 34 generates a DHCP proxy request on behalf of node 28. PON interface module 34 may maintain a table that maps particular subnets or nodes 28 to particular routers that serve the subnets or nodes. In this manner, DHCP relay agent 38 may associate a DHCP proxy request from a node 28 with an appropriate router 20 and DHCP server 36. DHCP relay agent 38 may take the form of a software process running on PON interface module 34.

Routers 20 route the proxy DHCP request to an appropriate ISP 18 based on the subnet to which the node 28 is assigned. For example, ISPs 18A, 18B typically may deliver service for one or more different subnets in the PON served by PON interface 12. One of DHCP servers 36A, 36B (collectively 36) maintained by ISPs 18 assigns an IP address to the network node that originated the DHCP request. In particular, a DHCP server 36 for the appropriate subnet responds to DHCP relay agent 36 with an IP address within the subnet.

DHCP relay agent 36 sends the IP address to the particular node 28 that generated the DHCP request. Upon assignment of the IP address, PON interface module 34 makes an entry for the requesting node 28 in its ARP cache, matching the assigned IP address with the media access control (MAC) address of the node. By providing a DHCP relay agent 38 within PON interface module 34, IP addresses within a particular subnet can be assigned to nodes 28 in different groups 26 coupled via different optical fiber links 11.

For example, a first PON interface module 34A, acting as a proxy for nodes 28 within a group 26A, can receive IP addresses with a given subnet scope, while a second PON interface module 34B, acting as proxy for nodes within a second group 26B, can receive IP addresses with in the same subnet scope. With DHCP relay agent 36, PON interface module 34 functions as a gateway within PON 10, enabling assignment of IP addresses within the same subnet to network nodes 28 coupled to different PON interface modules. This feature avoids allocation of an entire class C subnet to each PON interface module 34. Instead, different PON interface modules 34 can share a common class C subnet address.

Moreover, a single PON interface module 34 can serve network nodes 28 with IP addresses within different subnet scopes. As a result, different ISPs 18 can serve network nodes 28 via a common optical fiber link 11, providing end users, sometimes referred to as "subscribers," with a choice among two or more ISPs. If an end user elects to take service from a first ISP 18A, the network node 28 associated with that end user is assigned an IP address within the subnet scope served by the first ISP 18A. Alternatively, if an end user elects to take service from second ISP 18B, or other ISPs, the network node 28 is assigned an IP address within a different subnet scope.

As an illustration, a first network node 28A within a group 26A could have an IP address of 192.86.8.x, whereas a second network node 28B could have an IP address of 192.87.8.x. In this case, first network node 28A would be served by a first ISP 18A (serving Class C subnet 192.86.8.0), and second network node 28B would be served by a second ISP 18B (serving Class C subnet 192.87.8.0), both via a common PON interface module 34A. Similarly, a first network node 28C within a group 26B served by another PON interface module 34B could have an IP address of 192.86.8.x, and be served by ISP 18A. A second network node 28D within the same group 26B served by PON interface module 34B could have an IP address of 192.87.8.x and be served by ISP 18B.

Hence, a single DHCP server 36 can assign IP addresses to network nodes 28 in first and second groups 26A, 26B in response to the DHCP proxy requests generated by first and second DHCP relay agents 38A, 38B. In each case, the subnet scope may include, e.g., 255 IP addresses. Often, the number of network nodes in each of the first and second groups 26A, 26B may be less than 255, which would result in wasted IP addresses in an existing PON 10. In accordance with the invention, however, the 255 IP addresses can be distributed over a potentially larger number of network nodes 28 residing in multiple groups 26.

As a further example, to serve 128 network nodes 28, it ordinarily would be necessary to assign 128 IP addresses of the major subnet scope for minor subnet gateway addresses. According to the invention, no minor subnet gateway addresses are required, allowing the 128 IP addresses to be assigned to network nodes 28 individually. In addition, the major IP address subnet scope can be used across the independent PON interface modules 34, with the use of only one IP address of the major subnet scope used for each PON interface module. Thus, an ISP 18 can consume less class C IP address spaces when attaching to several independent PON interface modules 34.

Figure 4:
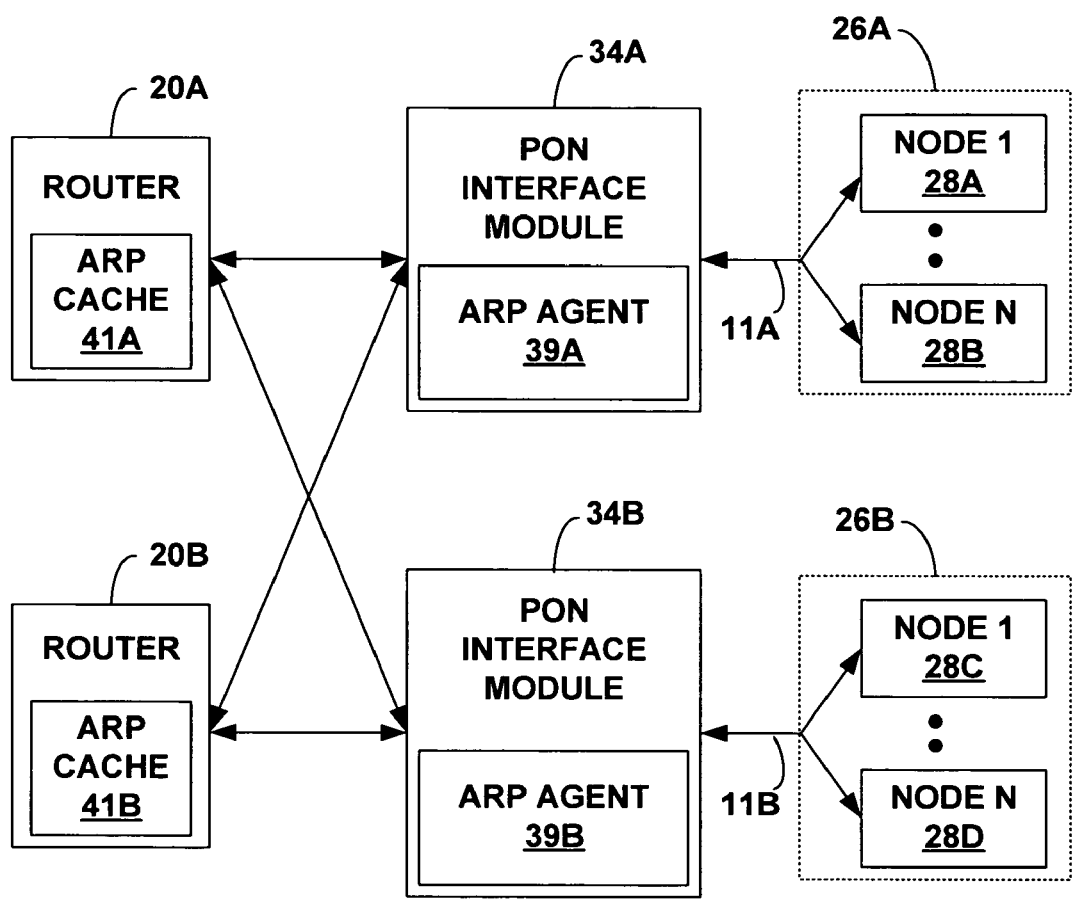
FIG. 4 is a block diagram illustrating a PON as shown in FIG. 3 with an ARP agent feature.

FIG. 4 is a block diagram illustrating a PON as shown in FIG. 3 with an ARP agent feature. When an incoming packet bearing one of the assigned IP addresses arrives at a router 20, i.e., a packet destined for a network node 28, the router generally will not resolve the correct PON interface module 34A or 34B by reference to a single subnet, because either PON interface module may serve nodes within multiple subnets. Rather, router 20 may resolve the address of the destination node 28 by reference to IP addresses of network nodes 28 served by the PON interface module. PON interface module 34 then may resolve the correct network node 28 by reference to an ARP cache maintained by the PON interface module for network nodes to which it has assigned IP addresses.

For an outgoing packet, i.e., originated from a network node 28, a given PON interface module 34 may be unable to resolve an appropriate address from the ARP cache. In particular, even though the destination node 28 for the packet may reside within the same subnet as the source node, the destination node may be coupled to a different PON interface module 34 and optical fiber link 11 than the source node. In this case, the PON interface module 34 that serves the source network node 28 will have no record of the IP address of the destination network node in its ARP cache.

For this reason, as shown in FIG. 4, each PON interface module 34 may further include an ARP agent 39A, 39B (collectively 39). ARP agent 39 may take the form of a software process running on PON interface module 34. In response to receipt of an ARP request from a network node 28, PON interface module 34 first consults its local ARP cache for an IP address that matches a MAC address contained in the request. If no entry exists for the particular MAC address, ARP agent 39 generates a proxy ARP request. PON interface module 34 then transmits the proxy ARP request to a router 20 serving the pertinent subnet, i.e., the subnet assigned to the source network node 34.

In turn, router 20 consults its ARP cache 41A, 41B (collectively 41), and identifies entries for any other PON interface modules 34 that presently serve the same subnet. Upon identification of a PON interface module 34 that serves the same subnet, the pertinent PON interface module consults its ARP cache and provides the requested address, or returns an ARP failure reply if no such address exists. In this manner, ARP agent 39 facilitates transmission of packets among network nodes 28 within a particular subnet, even though the nodes may be distributed across PON 10 in disparate groups 26 coupled to different optical fiber links 11 and different PON interface modules 34.

Figure 5:
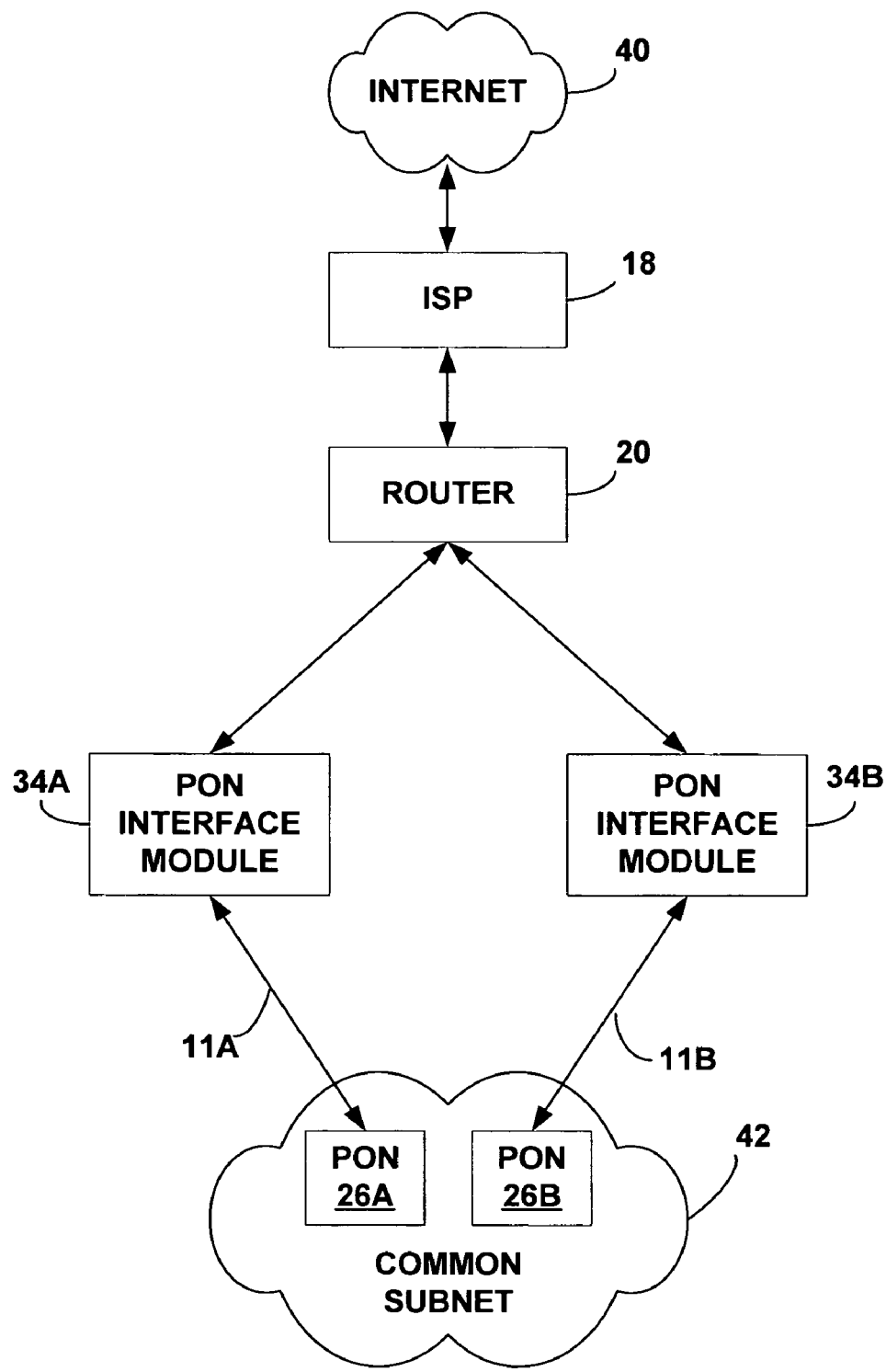
FIG. 5 is a block diagram further illustrating the arrangement of a PON as shown in FIG. 3.

FIG. 5 is a block diagram further illustrating the arrangement of a PON as shown in FIG. 3. In general, FIG. 5 depicts allocation of IP addresses to network nodes 28 residing in different groups 26A, 26B. As shown in FIG. 5, different groups 26A, 26B of network nodes are coupled to different PON interface modules 34A, 34B, but carry IP addresses that reside in a common subnet 42. In other words, multiple endpoints in the PON share a common subnet. The relatively larger number of network nodes 28 in multiple groups 26 promotes more efficient use of IP addresses within the PON.

Figure 6:
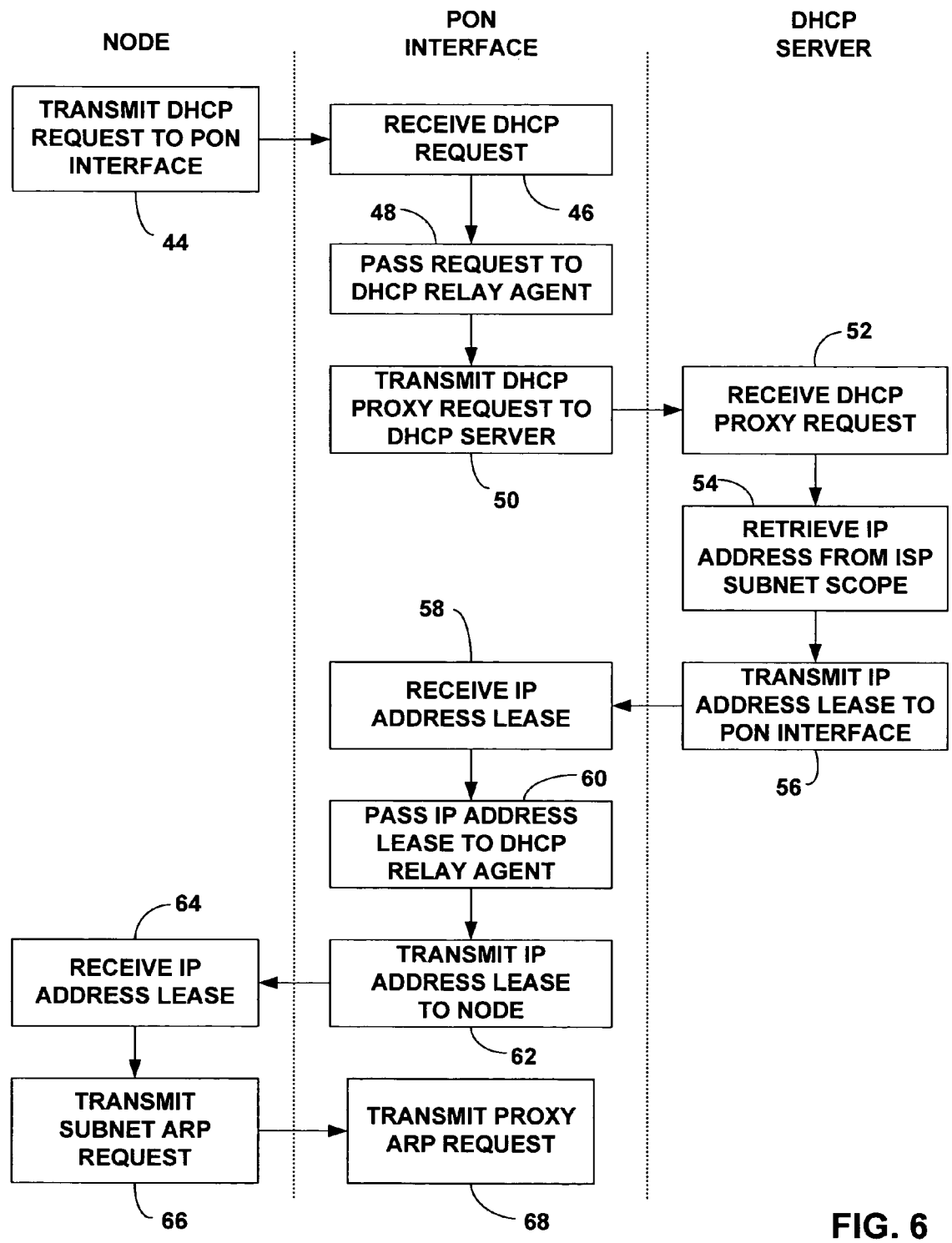
FIG. 6 is a flow diagram illustrating interaction of various PON components to allocate IP addresses.

FIG. 6 is a flow diagram illustrating interaction of various PON components to allocate IP addresses in accordance with the invention. As shown in FIG. 6, when a network node 28 transmits a DHCP request to a PON interface module 34 (44, 46), the PON interface module passes the DHCP request to a DHCP relay agent 38 (48). DHCP relay agent 38 transmits a DHCP proxy request to DHCP server 36 on behalf of the network node 28 (50). For example, DHCP relay agent 38 determines a router 20 and ISP 18 associated with the requesting node, and selects an appropriate link for transmitting the request to the router. Because a PON interface module 34 may serve nodes 28 in different subnets, the PON interface module 34 may include a table or other data structure that maintains a mapping between subnets and routers 20 or between nodes and routers. The data structure may be stored on a computer-readable medium such as a hard drive, removable magnetic or optical drive, solid state memory, or the like. DHCP relay agent 38 may refer to the mapping in selecting an appropriate link to a router. Upon receipt of the DHCP proxy request (52), DHCP server 36 retrieves an IP address from a pool of available addresses within the selected subnet scope reserved by the ISP 18 (54). DHCP server 36 then transmits an IP address lease to PON interface module 34 (56). As is well known in the art, the IP address lease specifies an IP address and a duration for which the IP address will remain in force for the requestor.

Upon receiving the IP address lease (58), PON interface module passes the IP address lease to DHCP relay agent 38 (60), which then transmits the IP address lease to the network node 28 that initiated the original DHCP request (62). The network node 28, upon receiving the IP address lease (64) thereafter carries the IP address for the duration of the lease specified by DHCP server 36. In subsequent activity, network node 28 may transmit subnet ARP requests (66) to resolve the IP addresses of other nodes in the same subnet scope. PON interface module 34, as described above, may incorporate an ARP agent 39 that transmits a proxy ARP request (68), if necessary, to resolve the address of a destination node.

Various embodiments of the invention have been described. These and other embodiments are within the scope of the following claims.

The invention claimed is:

1. A passive optical network comprising:
    a first group of network nodes coupled to a first optical fiber link;
    a second group of network nodes coupled to a second optical fiber link;
    a first DHCP server that assigns Internet Protocol (IP) addresses within a first common subnet scope to at least some of the network nodes in the first group and at least some of the network nodes in the second group; and
    a second DHCP server that assigns IP addresses of a second common subnet scope to at least some of the network nodes in the first group and at least some network nodes in the second group, wherein the second common subnet scope is different from the first common subnet scope.

2. The passive optical network of claim 1, further comprising:
    a first interface module that transmits information to the first group of nodes via the first optical fiber link; and
    a second interface module that transmits information to the second group of nodes via the second optical fiber link.

3. The passive optical network of claim 2, wherein the first interface module includes an address resolution protocol (ARP) agent that generates proxy ARP requests for the first group of network nodes to determine IP addresses for network nodes in the second group of network nodes.

4. The passive optical network of claim 3, further comprising a router that directs information to and from the first interface module and the second interface module, wherein the router includes an ARP cache storing IP addresses for network nodes in the first and second groups of network modes.

5. The passive optical network of claim 4, wherein the first interface module includes an ARP cache storing IP addresses for network nodes in the first group of network nodes, and the second interface module includes an ARP cache storing IP addresses in the second group of network nodes.

6. The passive optical network of claim 1, wherein the first DHCP server is associated with a first network service provider and the second DHCP server is associated with a second network service provider.

7. The passive optical network of claim 6, wherein each of the first and second network service providers is an Internet service provider.

8. The passive optical network of claim 1, wherein the common subnet scope includes 255 IP addresses and the number of network nodes in each of the first and second groups is less than 255.

9. A method comprising:
    assigning, with a first dynamic host configuration protocol (DHCP) server, Internet Protocol (IP) addresses to at least some network nodes of a first group of network nodes coupled to a first optical fiber link;
    assigning, with the first DHCP server, IP addresses to at least some network nodes of a second group of network nodes coupled to a second optical fiber link, wherein at least some of the IP addresses assigned to the network nodes in the first group by the first DHCP server and at least some of the IP addresses assigned to the network nodes in the second group by the first DHCP server are within a first common subnet scope;
    assigning, with a second DHCP server, IP addresses to at least some of the network nodes in the first group of network nodes; and
    assigning, with the second DHCP server, IP addresses to at least some of the network nodes of the second group, wherein at least some of the IP addresses assigned to at least some of the network nodes in the first group by the second DHCP server and at least some of the IP addresses assigned to the network nodes in the second group by the second DHCP server are within a second common subnet scope different from the first common subnet scope.

10. The method of claim 9, further comprising:
    generating first DHCP proxy requests for the first group of network nodes via a first DHCP relay agent; and
    generating second DHCP proxy requests for the second group of network nodes via a second DHCP relay agent;
    wherein assigning IP addresses comprises assigning IP addresses to the network nodes in the first and second groups with the first and second DHCP servers in response to the first and second DHCP proxy requests.

11. The method of claim 9, wherein the first DHCP server is associated with a first network service provider and the second DHCP server is associated with a second network service provider.

12. The method of claim 11, wherein each of the first and second network service providers is an Internet service provider.

13. The method of claim 9, wherein the common subnet scope includes 255 IP addresses and the number of network nodes in each the first and second groups is less than 255.

14. The method of claim 9, further comprising generating proxy address resolution protocol (ARP) requests for the first group of network nodes to determine IP addresses for network nodes in the second group of network nodes.

15. The method of claim 9, wherein the information includes voice, video and data packets.

16. A passive optical network (PON) interface that is coupled to a group of network nodes via an optical fiber link, the PON interface comprising:

a computer-readable medium containing a data structure that maps a first network node of the group of network nodes to a first dynamic host configuration protocol (DHCP) server and maps a second network node of the group of network nodes to a second DHCP server; and a relay agent to receive a DHCP request for an assignment of a network address from one of the first and second network nodes, map the request to the respective one of the DHCP servers that is associated with the node in accordance with the data structure, select an appropriate link for communicating the request to the respective DHCP server that is associated with the node, and communicate the request to the respective DHCP server that is associated with the node on the selected link.

17. A method comprising:

receiving, with a passive optical network (PON) interface that is coupled to a group of network nodes via an optical fiber link, a request for an assignment of a network address from one of the network nodes, wherein the PON interface couples to a plurality of dynamic host configuration protocol (DHCP) servers via a plurality of links;

accessing a data structure that associates a first portion of the network nodes of the group to a first DHCP server of the plurality of DHCP servers and associates a second portion of the network nodes of the group to a second DHCP server of the plurality of DHCP servers;

mapping the request to one of the plurality of DHCP servers that is associated with the node in accordance with the data structure;

selecting one of the plurality of links for communicating with the one of the plurality of the DHCP servers that is associated with the node; and communicating a DHCP proxy request to the one of the plurality of the DHCP servers that is associated with the node on the selected link.

\* \* \* \* \*